United States Patent
Varadarajan et al.

(10) Patent No.: US 9,658,890 B2
(45) Date of Patent: May 23, 2017

(54) RUNTIME AGNOSTIC REPRESENTATION OF USER CODE FOR EXECUTION WITH SELECTED EXECUTION RUNTIME

(75) Inventors: Krishnan Varadarajan, Redmond, WA (US); Michael L. Chu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 257 days.

(21) Appl. No.: 12/900,705

(22) Filed: Oct. 8, 2010

(65) Prior Publication Data

US 2012/0089968 A1 Apr. 12, 2012

(51) Int. Cl.
*G06F 9/50* (2006.01)
*G06F 9/45* (2006.01)
*G06F 9/455* (2006.01)

(52) U.S. Cl.
CPC .................. *G06F 9/5033* (2013.01)

(58) Field of Classification Search
USPC ........................................ 717/136, 147, 157
See application file for complete search history.

(56) References Cited

U.S. PATENT DOCUMENTS

| | | |
|---|---|---|
| 6,182,277 B1 | 1/2001 | DeGroot et al. |
| 6,321,373 B1 | 11/2001 | Ekanadham et al. |
| 6,457,172 B1 | 9/2002 | Carmichael et al. |
| 7,000,151 B2 | 2/2006 | Dwyer |
| 7,055,142 B2 * | 5/2006 | Meredith et al. ............. 717/136 |
| 7,100,164 B1 * | 8/2006 | Edwards ....................... 717/136 |
| 7,210,145 B2 | 4/2007 | Srinivasan |
| 7,401,329 B2 | 7/2008 | De Rijck |
| 7,415,700 B2 | 8/2008 | Pomaranski et al. |
| 7,458,066 B2 * | 11/2008 | Rhine ........................... 717/136 |
| 7,660,884 B2 | 2/2010 | Pu |
| 7,676,791 B2 | 3/2010 | Hamby et al. |
| 7,739,663 B2 | 6/2010 | Newcomb, Jr. |
| 2003/0229639 A1 * | 12/2003 | Carlson et al. ............... 707/100 |
| 2004/0015502 A1 * | 1/2004 | Alexander et al. ........... 717/147 |
| 2004/0098374 A1 * | 5/2004 | Bayliss et al. ..................... 707/3 |
| 2004/0205179 A1 | 10/2004 | Hunt et al. |
| 2005/0166182 A1 | 7/2005 | Wang et al. |
| 2007/0027912 A1 | 2/2007 | Chrysanthakopoulos |

(Continued)

FOREIGN PATENT DOCUMENTS

JP 2007328415 12/2007

OTHER PUBLICATIONS

Dotsenko et al., "A Multi-platform Co-Array Fortran Compiler," PACT, 2004, 12pg.*

(Continued)

*Primary Examiner* — Ryan Coyer
(74) *Attorney, Agent, or Firm* — Dicke, Billig & Czaja, PLLC

(57) ABSTRACT

An execution environment in a computer system allows user code to be executed using multiple execution runtimes. The execution environment translates the user code into a runtime agnostic representation, selects an execution runtime for executing the runtime agnostic representation, and invokes a scheduler for the selected execution runtime. The scheduler dispatches tasks from the runtime agnostic representation for execution by the computer system using concurrency mechanisms in the selected execution runtime.

19 Claims, 5 Drawing Sheets

(56) References Cited

U.S. PATENT DOCUMENTS

| | | |
|---|---|---|
| 2007/0214171 A1 | 9/2007 | Behnen et al. |
| 2007/0245319 A1 | 10/2007 | Muenkel et al. |
| 2008/0201721 A1 | 8/2008 | Little et al. |
| 2008/0271042 A1 | 10/2008 | Musuvathi et al. |
| 2008/0282238 A1 | 11/2008 | Meijer et al. |
| 2009/0158248 A1* | 6/2009 | Linderman et al. .......... 717/106 |
| 2009/0183144 A1 | 7/2009 | Aupperle et al. |
| 2009/0292797 A1* | 11/2009 | Cromp et al. ................ 709/223 |
| 2009/0307660 A1 | 12/2009 | Srinivasan |
| 2009/0327458 A1 | 12/2009 | Liu et al. |
| 2010/0088666 A1 | 4/2010 | Box et al. |
| 2010/0153959 A1 | 6/2010 | Song et al. |
| 2010/0175049 A1 | 7/2010 | Ramsey et al. |
| 2010/0250564 A1 | 9/2010 | Agarwal et al. |
| 2012/0089967 A1 | 4/2012 | Varadarajan et al. |
| 2012/0089969 A1 | 4/2012 | Varadarajan et al. |
| 2012/0137277 A1 | 5/2012 | Varadarajan et al. |

OTHER PUBLICATIONS

Gasper et al., "Automatic Parallelization of Sequential C Code," Midwest Instruction and Computing Symposium, Duluth, MN, 2003, 11pg.*
Polychronopoulos, Constantine D., "The Hierarchical Task Graph and its Use in Auto-Scheduling," ACM, 1991, 11pg.*
Wang et al., "XCLONER: An Interactive Multiplatform Parallel Image Processing Development Environment," IEEE, 1992, 9pg.*
Isard et al., "Distributed Data-Parallel Computing Using a High-Level Programming Language," ACM, 2009, 8pg.*
"International Search Report and Written Opinion," Mailed Date: Mar. 20, 2012, International Application No. PCT/US2011/053006, filed Date: Sep. 23, 2011, pp. 10.
Polychronopoulos, Constantine D., "The Hierarchical Task Graph and its Use in Auto-Scheduling," Retrieved at <<www.daimi.au.dk/~u040896/temp/ . . . /p252-polychronopoulos.pdf>>, Proceedings of the 5th international conference on Supercomputing, Jun. 17-21, 1991, pp. 252-263.
Paulson, Lawrence., "A Semantics-Directed Compiler Generator," Retrieved at <<www.cl.cam.ac.uk/~lp15/papers/Reports/popl82.pdfSimilar>>, In the 9th ACM SIGPLAN-SIGACT symposium on principles of programming languages, 1982, pp. 224-233.
The Notice on the First Office Action for Application No. 201110314213.8 dispatched Oct. 18, 2013 (3 pgs.).
Gunal, Atilla, "Resource Management in Concurrency Runtime—Part 2", Retrieved at << http://blogs.msdn.com/b/nativeconcurrency/archive/2009/07/21/resource-management-in-concurrency-runtime-part-2.aspx >>, Jul. 21, 2009, pp. 2.
Schneider, et al., "Elastic Scaling of Data Parallel Operators in Stream Processing", Retrieved at << http://people.cs.vt.edu/~scschnei/papers/ipdps09.pdf>>, International Symposium on Parallel & Distributed Processing, IEEE, May 23-29, 2009, pp. 12.
Tran, et al., "Parallel Programming with Data Driven Model", Retrieved at <<http://ieeexplore.ieee.org/stamp/stamp.jsp?arnumber=00823413 >>, Proceedings, 8th Euromicro Workshop on Parallel and Distributed Processing, 2000, pp. 7.
Sen, Siddhartha, "Dynamic Processor Allocation for Adaptively Parallel Work-Stealing Jobs", Retrieved at <<http://supertech.csail.mit.edu/papers/sid-thesis.pdf>>, Sep. 2004, p. 1-82.
The Office Action for U.S. Appl. No. 12/900,696 mailed Aug. 19, 2013 (16 pgs.).
The Final Office Action for U.S. Appl. No. 12/900,696 mailed Dec. 5, 2013 (14 pgs.).
The Applicant-Initiated Interview Summary for U.S. Appl. No. 12/900,696 mailed Mar. 24, 2014 (3 pgs.).
The Office Action for U.S. Appl. No. 12/900,696 mailed Jun. 19, 2014 (16 pgs.).
The Final Office Action for U.S. Appl. No. 12/900,696 mailed Oct. 29, 2014 (17 pgs.).

The International Preliminary Report on Patentability for International Application No. PCT/US2011/053006 mailed Apr. 18, 2013 (7 pgs).
Bloch Inger, et al., "The Design of an API for Strict Multithreading in C++ Wolfgang Blochinger," retrieved at <<http://citeseerx.ist.psu.edu/viewdoc/download?doi= 1 0.1.1.95.2053&rep=rep1&type= pdf>>, Parallel Processing, 9th International Euro-Par Conference, 2003, 10 pages.
Assenmacher, et al., "PANDA—Supporting Distributed Programming in C++", Retrieved at << http://citeseerx.ist.psu.edu/viewdoc/download?doi=10.1.1.37.6262&rep=rep1&type=pdf >>, Proceedings of the 7th European Conference on Object-Oriented Programming, Proceedings of the 7th European Conference on Object-Oriented Programming, Jul. 26-30, 1993, pp. 23.
Chen, et al., "An Efficient Method for Expressing Active Object in C++", Retrieved at << http://delivery.acm.org/10.1145/510000/505872/p32-chen.pdf?key1=505872&key2=7266629721&coll=GUIDE&dl=GUIDE&CFID=95012390&CFTOKEN=99857617 >>,vol. 25, No. 3, May 2000, p. 32-35.
Wyk, Christopher J. Van, "Arithmetic Equality Constraints as C++ Statements", Retrieved at << http://citeseerx.ist.psu.edu/viewdoc/download?doi=10.1.1.14.2306&rep=rep1&type=pdf >>, Software—Practice and Experience, vol. 22, No. 6, Jun. 1992, p. 467-494.
Sen, Ranjan, "Developing Parallel Programs", Retrieved at << http://msdn.microsoft.com/en-us/library/cc983823.aspx >>, Sep. 2008, p. 1-13.
Sobral, et al., "ParC++: A Simple Extension of C++ to Parallel Systems", Retrieved at << http://ieeexplore.ieee.org/stamp/stamp.jsp?tp=&arnumber=647233&userType=inst >>, Parallel and Distributed Processing, Proceedings of the Sixth Euromicro Workshop on, Jan. 21-23, 1998 , p. 453-459.
The Office Action for U.S. Appl. No. 12/900,708 mailed Oct. 11, 2013 (36 pgs.).
Czarnecki et al., "DSL Implementation in MetaOCaml, Template Haskell, and C++," Springer-Verlag, 2004, 22 pgs.
Falcou et al., "QUAFF: efficient C++ design for parallel skeletons," Elsevier, 2006, 12 pgs.
Kerr, Kenny, "C++: The Most Powerful Language for .NET Framework Programming," Microsoft, 2004, 21 pgs.
Stichnoth et al., "Code Composition as an Implementation Language for Compilers," USENIX, 1997, 15 pgs.
Striegnitz et al., "An Expression Template aware Lambda Function," CiteSeer, 2000, 14 pgs.
Veldhuizen, Todd, "C++ Templates as Partial Evaluation," 1998, 13 pgs.
The Final Office Action for U.S. Appl. No. 12/900,708 mailed May 22, 2014 (36 pgs.).
The Office Action for U.S. Appl. No. 12/900,708 mailed Sep. 12, 2014 (26 pgs.).
The Office Action for U.S. Appl. No. 12/954,915 mailed Nov. 8, 2013 (18 pgs.).
The Final Office Action for U.S. Appl. No. 12/954,915 mailed Jun. 19, 2014 (19 pgs.).
The Office Action for U.S. Appl. No. 12/954,915 mailed Sep. 29, 2014 (21 pgs.).
The Final Office Action for U.S. Appl. No. 12/954,915 mailed Jan. 14, 2015 (19 pgs.).
Vasconcelos, et al., "Typechecking a Multithreaded Functional Language with Session Types," retrieved at <<http://citeseerx.ist.psu.edu/viewdoc/download?doi= 1 0.1.1.139.2836&rep=rep1&type=pdf>>, Theoretical Computer Science, vol. 368, No. 1-2, Dec. 2006, pp. 1-39.
Gillick, et al., "MapReduce: Distributed Computing for Machine Learning," retrieved at <<http://www.icsi.berkeley.edu/~arlo/publications/gillick_cs262a_proj.pdf >>, Dec. 18, 2006, 12 pages.
Flanagan, Cormac, "Hybrid Type Checking," retrieved at <<http://www.soe.ucsc.edu/~cormac/papers/popl06-hybrid.ps>>, The 33rd Annual ACM SIGPLAN-SIGACT Symposium on Principles of Programming Languages, Jan. 2006, 16 pages.
Isard, et al., "Dryad: Distributed Data-Parallel Programs from Sequential Building Blocks," retrieved from <<http://research.

(56) References Cited

OTHER PUBLICATIONS microsoft.com/pubs/63785/eurosys07.pd>>, Proceedings of European Conference on Computer Systems, 2007, 14 pages.
Yu, et al., "DryadLINQ: A System for General-Purpose Distributed Data-Parallel Computing Using a High-Level Language," retrieved at <<http://research.microsoft.com/en-us/projects/DryadLINQ/ DiyadLINQ.pdf>>, Proceedings of the 8th Symposium on Operating Systems Design and Implementation, 2008, 14 pages.
Yu, et al., "Some Sample Programs Written in DiyadLINQ," retrieved from <<http://research.microsoft.com/pubs/66811/programming-dryadlinq-dec2009.pdf>>, Microsoft Research Technical Report No. MSR-TR-2009-182, Microsoft Corporation, Redmond, Washington, 2009, 37 pages.
Isard, et al., "Distributed Data-Parallel Computing Using a High-Level Programming Language," retrieved from <<http://research. microsoft.com/pubs/1 02137/sigmod09.pdf>>, Proceedings of the 35th SIGMOD International Conference on Management of Data, 2009, 8 pages.
Yu, et al., "Distributed Aggregation for Data-parallel Computing: Interfaces and Implementations," retrieved at <<http://www.sigops. org/sosp/sosp09/papers/yu-sosp09.pdf>>, Proceedings of the ACM SIGOPS 22nd Symposium on Operating Systems Principles, 2009, 17 pages.
The Office Action for U.S. Appl. No. 12/900,696 mailed Apr. 7, 2015 (27 pgs.).
The Final Office Action for U.S. Appl. No. 12/954,915 mailed Jan. 13, 2016 (19 pgs.).
The Final Office Action for U.S. Appl. No. 12/900,696 mailed Oct. 8, 2015 (22 pgs.).
The Final Office Action for U.S. Appl. No. 12/900,708 mailed May 28, 2015 (32 pgs.).
The Office Action for U.S. Appl. No. 12/900,708 mailed Oct. 7, 2015 (28 pgs.).
The Office Action for U.S. Appl. No. 12/954,915 mailed Jul. 8, 2015 (25 pgs.).
The Office Action for U.S. Appl. No. 12/900,696 mailed Jun. 9, 2016 (24 pgs.).
The Final Office Action for U.S. Appl. No. 12/900,708 mailed May 10, 2016 (32 pgs.).
The Office Action for U.S. Appl. No. 12/954,915 mailed Jun. 30, 2016 (26 pgs.).
"New Common Knowledge at Era of Multi-Core: Usage of CPU", Software Design, Gijutsu-Hyohron Co., Ltd., vol. 225, Jul. 18, 2009, pp. 84-91. (3 pages).
The Notice of Allowance for U.S. Appl. No. 12/900,696 mailed Nov. 4, 2016 (9 pgs.).
The Notice of Allowance for U.S. Appl. No. 12/900,708 mailed Nov. 3, 2016 (13 pgs.).
The Final Office Action for U.S. Appl. No. 12/954,915 mailed Jan. 12, 2017 (24 pgs.).
Penry, et al., "Exposing Parallelism and Locality in a Runtime Parallel Optimization Framework", Retrieved at <<http://bardd.ee. byu.edu/Publications/cf10_adopar.pdf >>, Proceedings of the 7th ACM international conference on Computing frontiers, May 17-19, 2010, pp. 2.
Dean, et al., "MapReduce: Simplified Data Processing on Large Clusters", Retrieved at << MapReduce: Simplified Data Processing on Large Clusters >>, 2004, p. 1-13.
Rauchwerger, Lawrence, "Run-Time Parallelization: It's Time Has Come", Retrieved at <<http://citeseerx.ist.psu.edu/viewdoc/ download?doi=10.1.1.77.200&rep=rep1&type=pdf >>, In the Special Issue on Languages & Compilers for Parallel Computers, 1998, pp. 25.
Groff, Dana, "Lighting up Windows Server 2008 R2 Using the ConcRT on UMS", Retrieved at <<http://www.microsoftpdc.com/ 2009/SVR10 >>, Jul. 16, 2010, pp. 2.
"Concurrency Runtime Versus Other Concurrency Models", Retrieved at <<http://msdn.microsoft.com/en-us/library/dd998048. aspx >>, Jul. 16, 2010, pp. 4.
Tetterton, James C., "ParaFitter: Automatic Runtime Concurrency Configuration for Parallel Scientific Applications", Retrieved at << http://citeseerx.ist.psu.edu/viewdoc/download?doi=10.1.1.91. 2198&rep=rep1&type=pdf >>, 2007, pp. 50.
Saltz, et al., "Run-Time Parallelization and Scheduling of Loops", Retrieved at <<http://citeseerx.ist.psu.edu/viewdoc/ download;jsessionid=A9B5A8D2338A9DD518F6F514E3D7E44 2?doi=10.1.1.104.7198&rep=rep1&type=pdf >>, Proceedings of the first annual ACM symposium on Parallel algorithms and architectures, Jun. 18-21, 1989, pp. 35.
Penry, et al., "Exposing Parallelism and Locality in a Runtime Parallel Optimization Framework", Retrieved at <<http://bardd.ee. byu.edu/Publications/cf10_adopar.pdf >>, Proceedings of the 7th ACM international conference on Computing frontiers, May 17-19, 2010, pp. 2.
Dean, et al., "MapReduce: Simplified Data Processing on Large Clusters", Retrieved at <<MapReduce: Simplified Data Processing on Large Clusters>>, 2004, p. 1-13.
Rauchwerger, Lawrence, "Run-Time Parallelization: It's Time Has Come", Retrieved at <<http://citeseerx.ist.psu.edu/viewdoc/ download?doi=10.1.1.77.200&rep=rep1&type=pdf>>, In the Special Issue on Languages & Compilers for Parallel Computers, 1998, pp. 25.
Groff, Dana, "Lighting up Windows Server 2008 R2 Using the ConcRT on UMS", Retrieved at <<http://www.microsoftpdc.com/ 2009/SVR10>>, Jul. 16, 2010, pp. 2.
"Concurrency Runtime Versus Other Concurrency Models", Retrieved at <<http://msdn.microsoft.com/en-us/library/dd998048. aspx>>, Jul. 16, 2010, pp. 4.
Tetterton, James C., "ParaFitter: Automatic Runtime Concurrency Configuration for Parallel Scientific Applications", Retrieved at <<http://citeseerkist.psu.edu/viewdoc/download?doi=10.1.1.91. 2198&rep=rep1&type=pdf>>, 2007, pp. 50.
Saltz, et al., "Run-Time Parallelization and Scheduling of Loops", Retrieved at <<http://citeseerx.ist.psu.edu/viewdoc/ downloadjsessionid=A9B5A8D2338A9DD51BF6F514E3D7E44 2?doi=10.1.1.104.7198&rep=rep1&type=pdf>>, Proceedings of the first annual ACM symposium on Parallel algorithms and architectures, Jun. 18-21, 1989, pp. 35.
Hofstedt, et al., "Turtle++—A CIP-Library for C++", Retrieved at <<http://citeseerx.ist.psu.edu/viewdoc/download?doi=10.1.1146. 5490&rep=rep1&type=pdf>>, pp. 13. Oct. 22, 2005.

\* cited by examiner

US 9,658,890 B2

RUNTIME AGNOSTIC REPRESENTATION OF USER CODE FOR EXECUTION WITH SELECTED EXECUTION RUNTIME

BACKGROUND

Computer systems often have the ability to execute different parts of the same program concurrently (i.e., in parallel). A programmer generally expresses the concurrency within the program to enable concurrent execution of the specified parts. The expression of concurrency in programs, however, is usually tightly coupled to the execution environment used to execute the program. The execution environment for a program may include, for example, the type of computer system, the programming language of the program, and runtime library or libraries in a computer system. As a result of this coupling, a program written for one execution environment may not be executable with another execution environment.

Even if a program may be executable in different execution environments, the program may not be able to take full advantage of the compute resources available in some execution environments. For example, a program written for a single machine may not execute on a cluster or cloud of machines. Even if the program is modified to execute on a cluster or cloud, the program may not be able to use the resources that are made available dynamically, such as by adding a new machine to the cluster or cloud.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An execution environment in a computer system allows user code to be executed using multiple execution runtimes. The execution environment translates the user code into a runtime agnostic representation, selects an execution runtime for executing the runtime agnostic representation, and invokes a scheduler for the selected execution runtime. The scheduler dispatches tasks from the runtime agnostic representation for execution by the computer system using concurrency mechanisms in the selected execution runtime.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
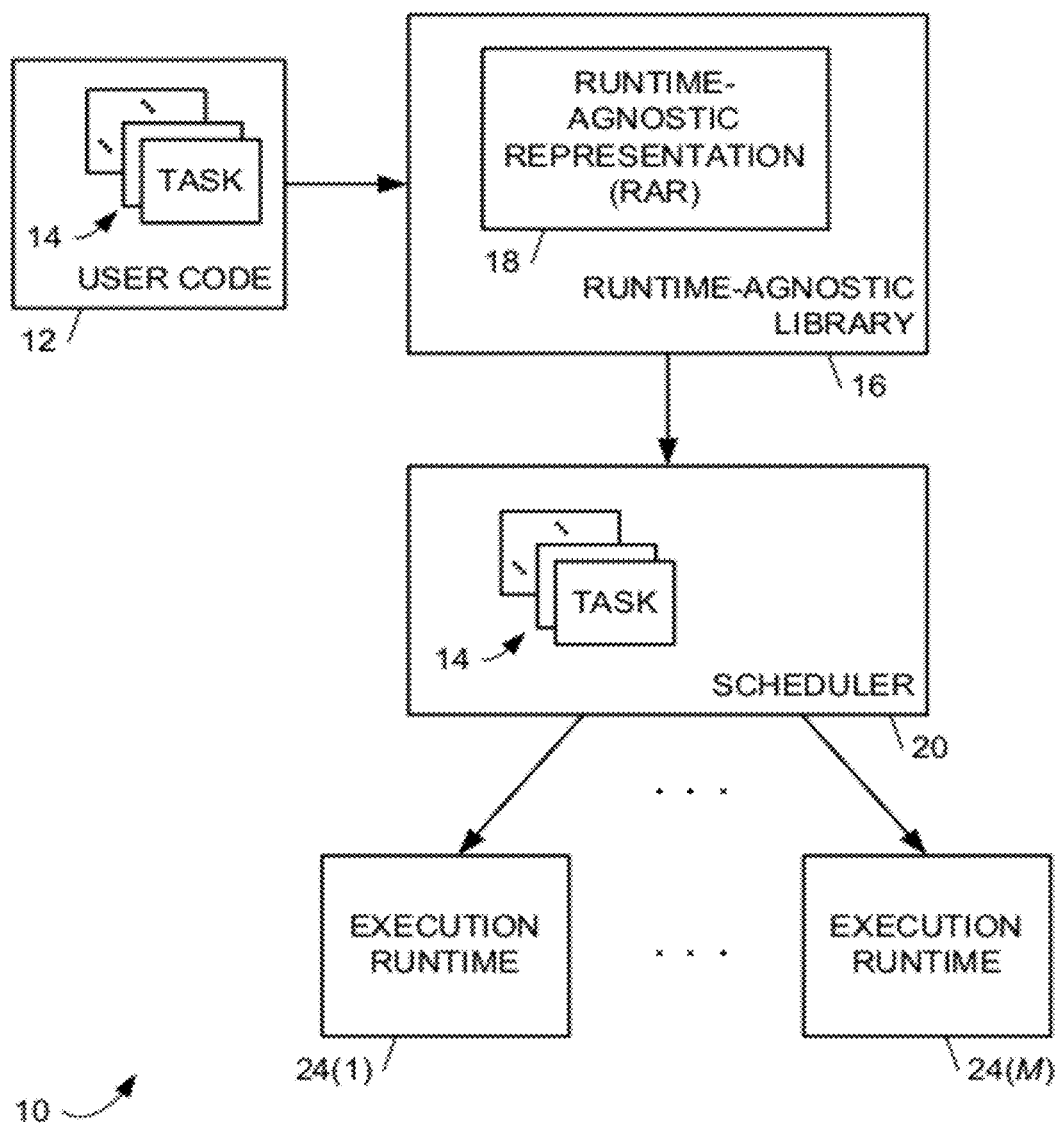
FIG. 1 is a block diagram illustrating an embodiment of an execution environment in a computer system.
Figure 4A:
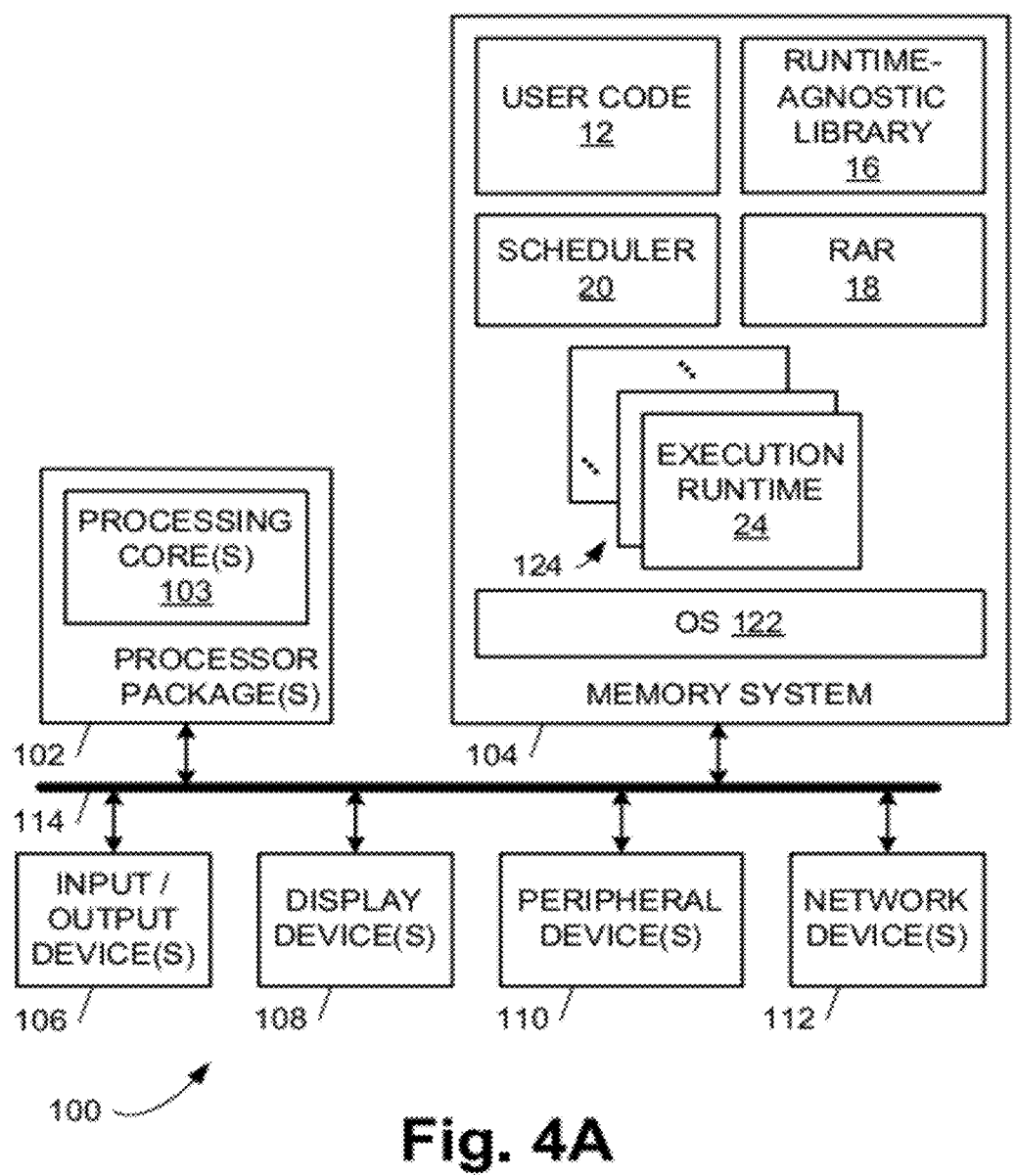
FIGS. 4A-4C are block diagrams illustrating embodiment of computer systems configured to implement the execution environment shown in FIG. 1.
Figure 4B:
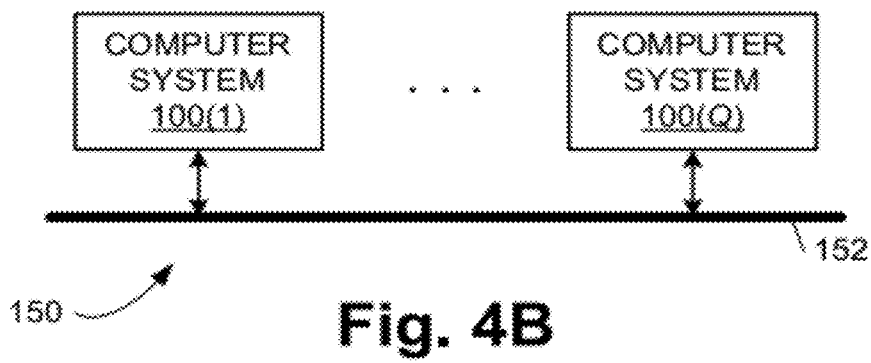
Figure 4C:
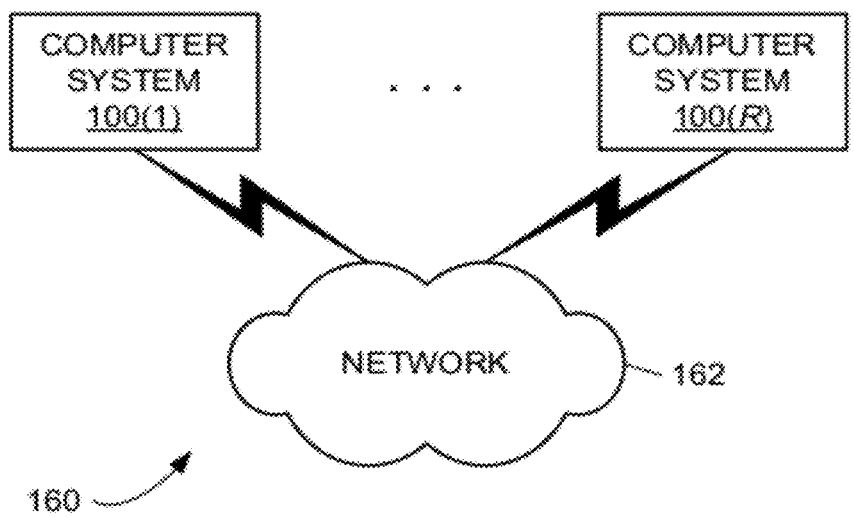

FIG. 1 is a block diagram illustrating an embodiment of an execution environment 10 in a computer system such as a computer system 100 shown in FIG. 4A (e.g., a single machine), a computer system 150 shown in FIG. 4B (e.g., a cluster of machines), or a computer system 160 shown in FIG. 4C (e.g., a cloud of machines). Execution environment 10 represents a runtime mode of operation in the computer system where the computer system is executing instructions on one or more processing cores of the computer system such as processing cores 103 shown in FIG. 4A and described in additional detail below. Execution environment 10 includes invoked user code 12 with a set of two or more tasks 14, runtime-agnostic library 16, a runtime-agnostic representation (RAR) 18 of user code 12, an invoked scheduler 20, and execution runtimes 24(1)-24(M), where M is an integer that is greater than or equal to two and denotes the Mth execution runtime 24(M).

Execution environment 10 provides a distributed tasks programming model that allows user code 12 to be executed using different execution runtimes 24(1)-24(M). In particular, execution environment 10 dynamically binds user code 12 to a selected execution runtime 24 to allow the execution of user code 12 to be scaled within the computer system of execution environment 10. Execution environment 10 allows tasks 14 defined by user code 12 to be executed concurrently using runtime-agnostic library 16, RAR 18, scheduler 20, and the selected execution runtime 24.

Each execution runtime 24(1)-24(M) typically corresponds to a programming language and/or programming model suitable for the underlying computer system. For example, one execution runtime 24 (e.g., the Microsoft Concurrency Runtime (ConcRT)) may be designed to enhance parallel execution of user code 12 on a single machine with multiple processing cores (e.g., computer system 100 shown in FIG. 4A), another execution runtime 24 (e.g., the Message Passing Interface (MPI) runtime) may be designed to enhance parallel execution of user code 12 on a cluster of machines (e.g., computer system 150 shown in FIG. 4B), and a further execution runtime 24 may be designed to enhance parallel execution of user code 12 on a cloud of machines (e.g., computer system 160 shown in FIG. 4C).

User code 12 includes a sequence of instructions that form an intuitive expression of one or more parallel algorithms. User code 12 bases each algorithm on data flow by specifying tasks 14 and the interactions of tasks 14 within each algorithm. User code 12 expresses tasks 14 and the interactions of tasks 14 without explicit reference to the programming features or constructs of any particular execution runtime 24(1)-24(M). Accordingly, user code 12 may be translated into RAR 18 and executed using a scheduler 20 and an execution runtime 24(1)-24(M) selected by runtime-agnostic library 16. In one embodiment, user code 12 includes an instruction that invokes an application program interface (API) in runtime-agnostic library 16 to initiate the execution of tasks 14. In other embodiments, user code 12 uses other programming language constructs and/or corresponding tools provided by runtime-agnostic library 16 to initiate the execution of tasks 14 using a dynamically selected execution runtime 24(1)-24(M).

Each task 14 includes a sequence of instructions that performs a unit of work when executed by the computer system. Each task 14 is self-contained (i.e., free of side effects) and operates on a defined set of input data to produce a defined set of output data. The set of output data produced by one task 14 may be used as all or a portion of the set of input data for another task 14. Accordingly, tasks 14 may use input data that was produced by one or more other tasks 14 and may produce output data that will be used as input data by one or more tasks 14. Tasks 14, however, are defined such that they do not share data (i.e., operate on the same set of data concurrently). Because the input and output data of tasks 14 are well-defined, the interactions of tasks 14 may be determined by runtime-agnostic library 16. Tasks 14 are coded such that each task 14 may be activated and dispatched by scheduler 20 for concurrent execution by processing cores of the computer system when the set of input data for the task 14 becomes available.

In one embodiment, user code 12 is written in a native, i.e., unmanaged, programming language such as C++. In this embodiment, each task 14 may be coded as an abstraction for a C++ Lambda expression that includes a set of sequential or other suitable instructions. In other embodiments, user code 12 may be written in other suitable native programming languages that may be translated into an RAR 18 and executed by a selected execution runtime 24(1)-24(M). Similarly, each task 14 may be coded using other suitable programming language constructs.

User code 12 may be configured to operate in one or more computer systems based on any suitable computer system execution model, such as a stack model or an interpreter model, and may represent any suitable type of code, such as an application, a library function, or an operating system service. User code 12 has a program state and machine state associated with a set of allocated resources of the computer system that include a defined memory address space. User code 12 executes autonomously or substantially autonomously from any co-existing processes in execution environment 10. Accordingly, user code 12 does not adversely alter the program state of co-existing processes or the machine state of any resources allocated to co-existing processes. Similarly, co-existing processes do not adversely alter the program state of user code 12 or the machine state of any resources allocated to user code 12.

In response to user code 12 initiating the execution of tasks 14, runtime-agnostic library 16 translates user code 12 into RAR 18, selects an execution runtime 24 for executing RAR 18, and invokes a scheduler 20 for the selected execution runtime 24. As noted above, user code 12 may invoke an API in runtime-agnostic library 16 or use another suitable programming construct to initiate the execution of tasks 14.

Runtime-agnostic library 16 identifies tasks 14 and the interactions of tasks 14 in user code 12 based on the inherent parallelism in user program 12. Runtime-agnostic library 16 translates user code 12 into RAR 18 such that RAR 18 embodies the inherent parallelism of user code 12 and may be executed by any of execution runtimes 24(1)-24(M). RAR 18 includes abstractions of tasks 14 that may be ported to a scheduler 20 of any of execution runtimes 24(1)-24(M). In one embodiment, runtime-agnostic library 16 generates RAR 18 by forming a directed acyclic graph (DAG) that specifies continuations between tasks 14 in user code 12 to represent the flow of data in user code 12. With a DAG, runtime-agnostic library 16 forms nodes that represent tasks 14 and expresses the relationships between the nodes according to the flow of data (i.e., interactions) between tasks. In other embodiments, runtime-agnostic library 16 generates RAR 18 using other suitable data structures to represent the inherent parallelism in user program 12.

Along with creating RAR 18, runtime-agnostic library 16 selects an execution runtime 24(1)-24(M) for executing user code 12 based on heuristics corresponding to the underlying computer system and RAR 18. In particular, runtime-agnostic library 16 attempts to achieve optimal scaling for user code 12 by selecting that execution runtime 24(1)-24(M) that may execute tasks 14 of user code 12 most efficiently. Runtime-agnostic library 16 considers the characteristics of user code 12 (e.g., data intensive versus compute intensive) and determines an appropriate level of computing resources for executing user code 12 (e.g., a single machine, a cluster of machines, or a cloud of machines) given the underlying computer system. After making the determination, runtime-agnostic library 16 creates an instance of a scheduler 20 for the selected execution runtime 24.

Scheduler 20 causes tasks 14 of user code 12 to be executed using the selected execution runtime 24 in execution environment 10. Scheduler 20 queues tasks 14 from RAR 18 and dispatches tasks 14 from user code 12 for execution by calling APIs or using other suitable programming constructs in the selected execution runtime 24. Scheduler 20 dispatches tasks 14 according to any suitable scheduling algorithm. Scheduler 20 manages the execution of tasks 14 by dispatching tasks 14 for execution when the set of input data for tasks 14 and processing resources of the computer system become available. As described above, the set of input data for a task 14 may become available upon completion of one or more other tasks 14.

By dynamically binding of user code 12 to a selected execution runtime 24, execution environment 10 delineates the programming model for user code 12 from the set of execution runtimes 24(1)-24(M). By doing so, the same user code 12 may be used to target different execution runtimes 24(1)-24(M) without incurring the overhead of including runtime-specific code for each execution runtime 24(1)-24(M). As a result, execution environment 10 supports a programming model for user code 12 that provides automatic scaling from a single machine to multiple machines (e.g., a cluster or a cloud).

Execution environment 10 may also provide a rich programming model that supports features of execution runtimes 24(1)-24(M). For example, one execution runtime 24, such as MPI, may specify that data passed between nodes in cluster of machines is to be serialized whereas another execution runtime 24, such as ConcRT, may allow data to be accessed using pointers on shared memory machines. With a rich programming model, user code 12 includes appropriate serialization routines for user defined types for runtimes 24 such as MPI. Execution environment 10 (i.e., runtime-agnostic library 16 and scheduler 20), however, ensures that the serialization routines are not invoked when user code 12 is executed on a shared memory machine.

Execution environment 10 may further provide a rich programming model that supports deadlock prevention and fault tolerance. By generating RAR 18, execution environment 10 precludes cycles and therefore eliminates deadlocks and avoids the use of expensive dynamic deadlock detection strategies. In addition, because tasks 14 are coded to be free of side effects, tasks 14 may be restarted on other computing nodes if a given computing node fails during the execution of a task 14.

In one embodiment, execution environment 10 is implemented using a declarative programming model on a native language such as C++. In this embodiment, user code 12 is written with a query syntax in the native language that inherently expresses tasks 14 in terms of data flow. With the query syntax, tasks 14 of user code 12 are side effect free by definition and have well-defined interactions. As a result, the execution of user code 12 may be automatically scaled from a single machine to a distributed environment such as a cluster or a cloud.

Figure 2:
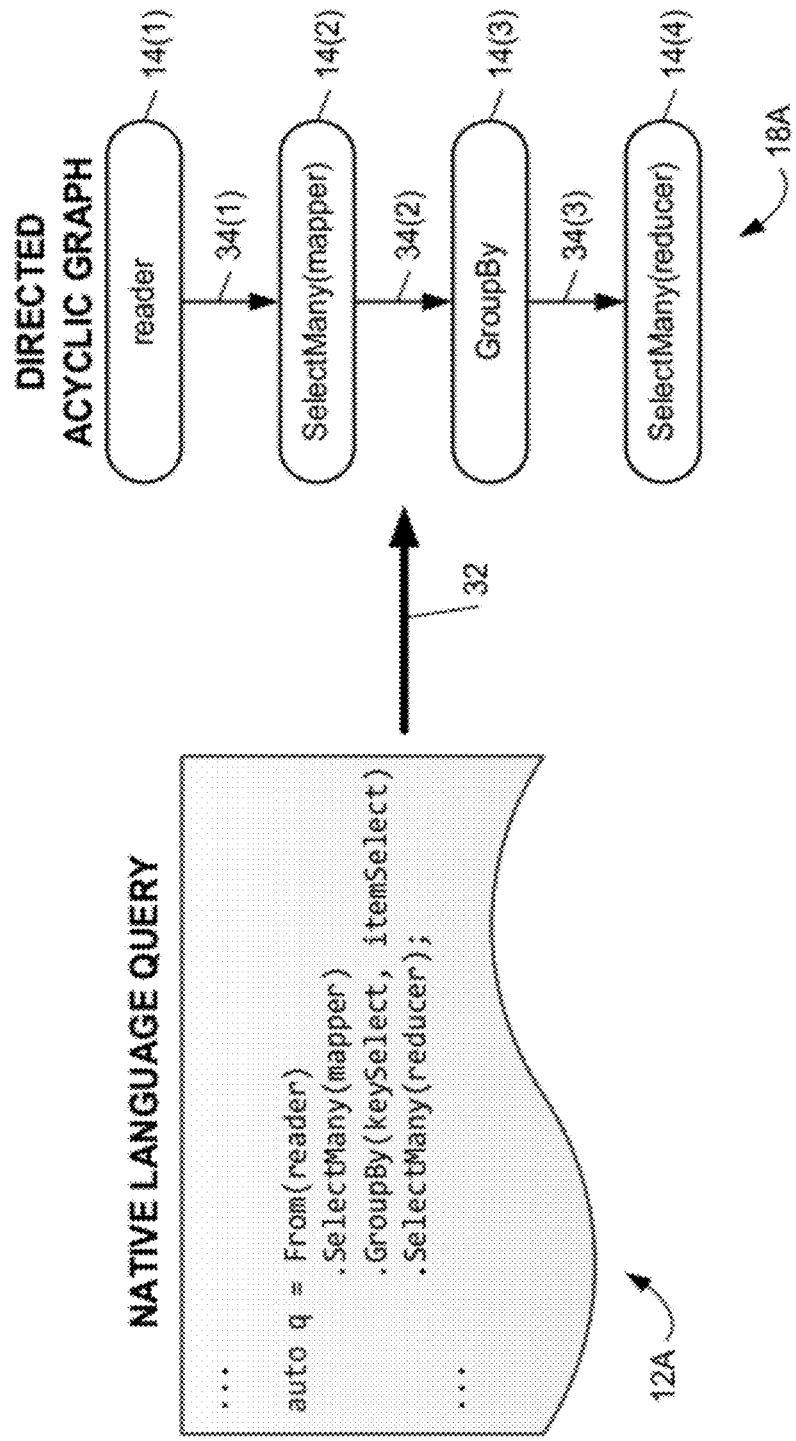
FIG. 2 is a block diagram illustrating an embodiment of generating a runtime agnostic intermediate representation of user code.

FIG. 2 is a block diagram illustrating an embodiment 12A of user code 12 with a query syntax. In the example of FIG. 2, user code 12A expresses a map-reduce operation as a native language query. By doing so, user code 12A allows runtime-agnostic library 16 to generate an embodiment of a RAR 18 that forms a runtime-agnostic DAG 18A as indicated by an arrow 32. Runtime-agnostic library 16 identifies tasks 14(1)-14(4) from the query in user code 12A (i.e., reader, SelectMany(mapper), GroupBy, and SelectMany(reducer), respectively) and translates a representation of tasks 14(1)-14(4) into DAG 18A (shown as blocks in a flow diagram in the embodiment of FIG. 2). Runtime-agnostic library 16 also identifies the interactions of tasks 14(1)-14(4) and translates a representation of the interactions into DAG 18A. The interactions specify continuations between tasks 14 that include the set of data that is output by one task 14 and input to another task 14. In FIG. 2, an arrow 34(1) represents the interaction between task 14(1) (i.e., reader) and task 14(2) (i.e., SelectMany(mapper)). In other words, arrow 34(1) represents the set of data that is output by task 14(1) and input to task 14(2). Similarly, an arrow 34(2) represents the interaction between task 14(2) and task 14(3), and an arrow 34(3) represents the interaction between task 14(3) and task 14(4).

In the example of FIG. 2, tasks 14 receive a set of input data from one other task 14 and provide a set of output data to one other task 14. In other embodiments, each task 14 may receive a set of input data from any suitable number of other tasks 14 and/or may provide a set of output data to any suitable number of other tasks 14.

In the embodiment of FIG. 2, the query syntax uses a method-based invocation strategy such that the query syntax is not directly integrated into the native programming language. For example, with a native programming language such as C++, the query syntax may be implemented using lambda expressions. The query syntax may be composed with other code in the native language in user code 12 and may allow for lazy execution of user code 12. As a result, a declarative programming model with a query syntax may be implemented on a native language such as C++ and use the existing native language compiler while providing increased execution performance in distributed environments.

In one embodiment, execution environment 10 provides dynamic data and compute resources elasticity for user code 12 to improve execution efficiency. In particular, execution environment 10 allows the execution of user code 12 to be elastic to the size of data operated on by tasks 14, the compute resources available at runtime, and any context-sensitive heuristics provided by user code 12. Execution environment 10 provides the elasticity through the use of RAR 18 and scheduler 20. Elasticity refers to the ability to dynamically adjust the level of concurrency for each task 14 of user code 12 based on the amount of data and compute resources available at the time of execution of that task 14.

As described above, scheduler 20 dispatches tasks 14 for execution when the set of input data for tasks 14 and processing resources of the computer system become available. For each task 14 in RAR 18, scheduler 20 determines the level of concurrency by considering the size of the set of input data for the task 14, the amount of compute resources available at the time of invocation of the task 14, and any context-sensitive heuristics provided by user code 12. Scheduler 20 invokes and distributes a number of instances of a task 14 that depends on the determined level of concurrency to the available compute resources. By doing so, scheduler 20 automatically scales the execution of user code 12 to an appropriate level given the size of the set of input data, the available compute resources, and the user-specified heuristics.

Scheduler 20 considers the size of the set of input data for each task 14 in determining an appropriate level of concurrency. In particular, scheduler 20 may consider the amount of overhead of moving the input data within the computer system (e.g., the time spent moving the data between machines in a cluster). For example, based on the overhead, scheduler 20 may select a lower level of concurrency for tasks 14 with smaller amounts of input data and a higher level of concurrency for tasks 14 with larger amounts of input data.

Because scheduler 20 determines the appropriate level of concurrency at the time of invocation for each task 14, scheduler 20 accounts for changes in the availability of compute resources in the underlying computer system. For example, scheduler 20 may detect that compute resources have been added to the computer system (e.g., due to one or more machines being added to the computer system) or removed from the computer system (e.g., due to failures or unavailability of one or more nodes of the computer system).

Scheduler 20 may provide information that expresses the size of the input data of a task 14 and the amount of available compute resources for a task 14 to one or more functions in user code 12. The functions, in turn, may provide scheduler 20 with a suggested or optimal level of concurrency that the programmer recommends for executing a task 14. Scheduler 20 considers this information along with the size of the input data and the amount of available compute resources to determine the appropriate level of concurrency for a task 14.

Figure 3:
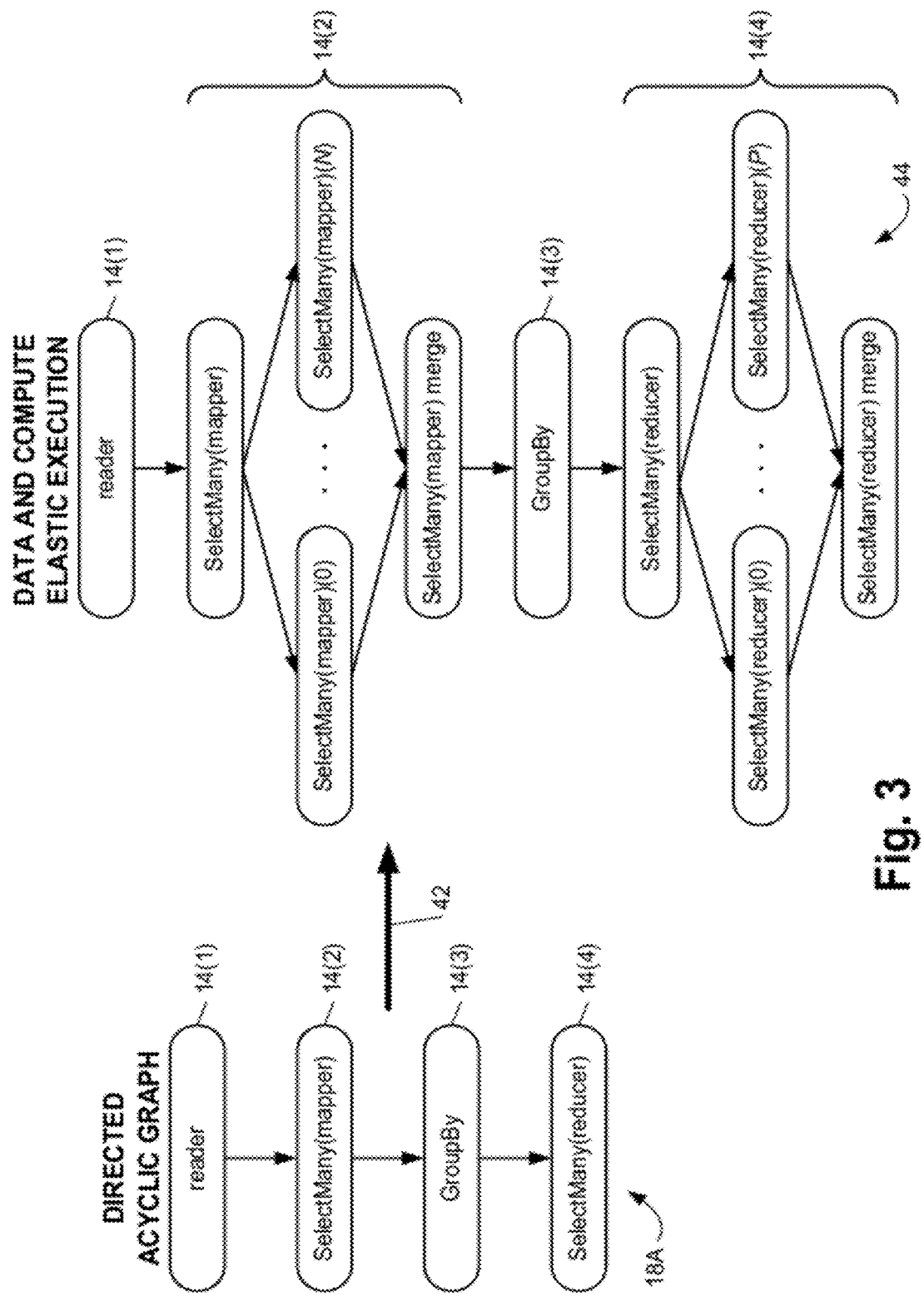
FIG. 3 is a block diagram illustrating an embodiment of executing user code using a runtime agnostic intermediate representation.

FIG. 3 is a block diagram illustrating an embodiment of executing user code 12 using DAG 18A (shown in FIG. 2). In the example of FIG. 3, scheduler 20 determines the appropriate level of concurrency for each of tasks 14(1)-14(4) in DAG 18A and creates an appropriate number of instances of each task 14(1)-14(4) based on the levels of concurrency. For example, scheduler 20 determines that a single instance is appropriate for task 14(1) based on the above factors when task 14(1) is invoked. Similarly, scheduler 20 determines that a single instance is appropriate for task 14(3) based on the above factors when task 14(3) is invoked.

For task 14(2), scheduler 20 determines that N instances are appropriate where N is an integer that is greater than or equal to two. Accordingly, scheduler 20 causes the set of input data for task 14(2) to be partitioned into N subsets and provided to up to N compute resources (e.g., nodes machines in a cluster or cloud) for execution. Scheduler 20 also causes the set of output data generated by task 14(2) to be merged into a form that can be provided to task 14(3).

For task 14(4), scheduler 20 determines that P instances are appropriate where P is an integer that is greater than or equal to two and may be equal or not equal to N. Accordingly, scheduler 20 causes the set of input data for task 14(4) to be partitioned into P subsets and provided to up to P compute resources (e.g., nodes machines in a cluster or cloud) for execution. Scheduler 20 also causes the set of output data generated by task 14(4) to be merged into a form that can be provided as an output of the query.

The dynamic data and compute elasticity provide a technique by which optimal scaling of user code 12 may occur. The flexibility in establishing the level of concurrency for each task 14 in RAR 18 or DAG 18A allows user code 12 to be elastic to available compute resources and load balance effectively. Accordingly, user code 12 may be efficiently executed on a variety of computer systems.

FIG. 4A is a block diagram illustrating an embodiment of computer system 100 which is configured to implement execution environment 10 as described above.

Computer system 100 includes one or more processor packages 102 that each include one or more processing cores 103, memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone or smartphone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more processing cores 103 that form execution hardware configured to execute instructions (i.e., software). Each processing core 103 is configured to execute instructions independently or substantially independently from the other processing cores 103 and includes a machine state. Each processor package 102 may include processing cores 103 with the same or different architectures and/or instruction sets. For example, the processing cores 103 may include any combination of in-order execution cores, superscalar execution cores, and GPGPU execution cores. Each processing core 103 in processor packages 102 is configured to access and execute instructions stored in memory system 104. The instructions may include a basic input output system (BIOS) or firmware (not shown), user code 12, runtime-agnostic library 16, scheduler 20, an operating system (OS) 122, and a set 124 of one or more execution runtimes 24. Each processing core 103 may execute the instructions in conjunction with or in response to information received from input/output devices 106, display devices 108, peripheral devices 110, and/or network devices 112.

Memory system 104 includes any suitable type, number, and configuration of volatile or non-volatile storage devices configured to store instructions and data. The storage devices of memory system 104 represent computer readable storage media that store computer-executable instructions (i.e., software) including user code 12, runtime-agnostic library 16, scheduler 20, OS 122, and a set 124 of one or more execution runtimes 24. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. The instructions are executable by computer system 100 to perform the functions and methods of user code 12, runtime-agnostic library 16, scheduler 20, OS 122, and execution runtimes 24 described herein. Examples of storage devices in memory system 104 include hard disk drives, random access memory (RAM), read only memory (ROM), flash memory drives and cards, and magnetic and optical disks such as CDs and DVDs.

Computer system 100 boots and executes OS 122. OS 122 includes instructions executable by processor packages 102 to manage the components of computer system 100 and provide a set of functions that allow runtime-agnostic library 16, scheduler 20, OS 122, and execution runtimes 24 to access and use the components. In one embodiment, OS 122 is the Windows operating system. In other embodiments, OS 122 is another operating system suitable for use with computer system 100. Runtime-agnostic library 16 includes instructions that are executable in conjunction with OS 122 to generate execution environment 10 shown in FIG. 1 and provide runtime functions to user code 12 and scheduler 20. The runtime functions may be included as an integrated part of OS 122 or other programming entities and/or constructs in other embodiments.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

FIG. 4B is a block diagram illustrating an embodiment of computer system 150 which is configured to implement execution environment 10 as described above. Computer system 150 forms a distributed computing environment that includes a set of two or more computer systems 100(1)-100(Q) where Q is an integer that is greater than or equal to two. Computer systems 100(1)-100(Q) communicate using a set of interconnections 152 that includes any suitable type, number, and configuration of controllers, buses, interfaces, and/or other wired or wireless connections.

Computer system 150 is configured as a cluster of machines (i.e., a cluster of computer systems 100(1)-100(Q)). Each computer system 100(1)-100(Q) may include the same configuration or different configuration as other computer systems 100(1)-100(Q). In one embodiment, each computer system 100(1)-100(Q)) in system 150 includes a runtime 24, such as MPI, that is configured for a cluster in addition to any other runtimes 24 that computer systems 100(1)-100(Q)) may include. In other embodiments, each computer system 100(1)-100(Q)) in system 150 includes any suitable type, number, and/or combination of runtimes 24.

FIG. 4C is a block diagram illustrating an embodiment of computer system 160 which is configured to implement execution environment 10 as described above. Computer system 160 forms a distributed computing environment that includes a set of two or more computer systems 100(1)-100(R) where R is an integer that is greater than or equal to two. Computer systems 100(1)-100(R) communicate using a network 162 that includes any suitable type, number, and configuration of wired and/or wireless network devices.

Computer system 160 is configured as a cloud of machines (i.e., a cloud of computer systems 100(1)-100(R)). Each computer system 100(1)-100(R) may include the same configuration or different configuration as other computer systems 100(1)-100(R). In one embodiment, each computer system 100(1)-100(R)) in system 160 includes a runtime 24 that is configured for a cloud in addition to any other runtimes 24 that computer systems 100(1)-100(R)) may include. In other embodiments, each computer system 100(1)-100(R)) in system 160 includes any suitable type, number, and/or combination of runtimes 24.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage medium, which does not include transitory propagating signals, storing computer-executable instructions that, when executed by a computer system, cause the computer system to perform a method comprising:
    selecting, solely by one and only one runtime-agnostic library, a first execution runtime in the computer system for execution of a runtime agnostic representation of user code including representing inherent parallelism in the user code, the first execution runtime selected based on at least one heuristic of the runtime agnostic representation and compute resources of the computer system available to the first execution runtime; and
    invoking, solely by the one and only one runtime-agnostic library, a scheduler to dispatch a set of tasks from the runtime agnostic representation for execution on the computer system using the first execution runtime.

2. The computer readable storage medium of claim 1, the method further comprising:
    translating the user code into the runtime agnostic representation that includes the set of tasks.

3. The computer readable storage medium of claim 1, wherein the user code inherently expresses the set of tasks and a set of interactions of the set of tasks.

4. The computer readable storage medium of claim 1, wherein the user code specifies the set of tasks and a set of interactions of the set of tasks using a query syntax.

5. The computer readable storage medium of claim 1, wherein the runtime agnostic representation is executable by the first execution runtime and a second execution runtime that differs from the first execution runtime.

6. The computer readable storage medium of claim 1, wherein the runtime agnostic representation expresses the set of tasks in terms of data flow.

7. The computer readable storage medium of claim 1, wherein the runtime agnostic representation forms a directed acyclic graph (DAG).

8. The computer readable storage medium of claim 1, wherein the first execution runtime corresponds to one of a single machine, a cluster of machines, or a cloud of machines.

9. The computer readable storage medium of claim 1, wherein the computer system includes one of a single machine, a cluster of machines, or a cloud of machines.

10. The computer readable storage medium of claim 1, wherein the scheduler is configured to dispatch a task in the set of tasks in response to set of input data corresponding to the task becoming available.

11. A computer readable storage medium, which does not include transitory propagating signals, storing computer-executable instructions that, when executed by a computer system, cause the computer system to perform a method comprising:
    identifying, solely by one and only one runtime-agnostic library, an inherently expressed set of tasks and set of interactions of the set of tasks in user code;
    translating, solely by the one and only one runtime-agnostic library, the set of tasks and the set of interactions into a runtime agnostic representation of the user code including representing inherent parallelism in the user code; and
    selecting, solely by the one and only one runtime-agnostic library, a first execution runtime in the computer system for execution of the runtime agnostic representation at runtime based on compute resources of the computer system available to the first execution runtime.

12. The computer readable storage medium of claim 11, wherein the runtime agnostic representation expresses the set of tasks in terms of data flow.

13. The computer readable storage medium of claim 11, wherein the runtime agnostic representation forms a directed acyclic graph (DAG).

14. The computer readable storage medium of claim 11, wherein the execution runtime corresponds to one of a single machine, a cluster of machines, or a cloud of machines.

15. The computer readable storage medium of claim 11, wherein the computer system includes a single machine, a cluster of machines, or a cloud of machines.

16. A method performed by at least one computer system, the method comprising:

translating, solely by one and only one runtime-agnostic library, user code into a runtime agnostic representation including representing inherent parallelism in the user code that forms a directed acyclic graph (DAG) that expresses a set of tasks in terms of data flow, wherein the user code inherently expresses the set of tasks and a set of interactions of the set of tasks;

selecting, solely by the one and only one runtime-agnostic library, a first execution runtime from a set of two or more execution runtimes in the computer system for execution of the runtime agnostic representation, the first execution runtime selected based on at least one heuristic of the runtime agnostic representation and compute resources of the computer system available to the first execution runtime; and invoking, solely by the one and only one runtime-agnostic library, a scheduler to dispatch the set of tasks from the runtime agnostic representation for execution on the computer system using the first execution runtime.

17. The method of claim 16, wherein the runtime agnostic representation is executable by the first execution runtime and a second execution runtime in the set of two or more execution runtimes, and wherein the second execution runtime differs from the first execution runtime.

18. The method of claim 16, wherein the first execution runtime corresponds to one of a single machine, a cluster of machines, or a cloud of machines.

19. The method of claim 16, wherein the computer system includes a single machine, a cluster of machines, or a cloud of machines.

* * * * *